United States Patent [19]

Peter et al.

[11] Patent Number: 5,110,162
[45] Date of Patent: May 5, 1992

[54] ANTI-CORROSIVE ROTARY JOINT

[75] Inventors: John H. Peter, Three Rivers; Gerald L. Timm, Schoolcraft, both of Mich.

[73] Assignee: The Johnson Corporation, Three Rivers, Mich.

[21] Appl. No.: 661,598

[22] Filed: Feb. 28, 1991

[51] Int. Cl.$^5$ ............................................. F16L 27/08
[52] U.S. Cl. .................................... 285/281; 285/190; 285/134
[58] Field of Search ................ 285/95, 134, 190, 278, 285/281, 136, 900

[56]  References Cited

U.S. PATENT DOCUMENTS

| 2,626,166 | 1/1953 | Fawick | 285/278 |
|---|---|---|---|
| 2,717,166 | 9/1955 | Hedden | 285/134 |
| 2,805,086 | 9/1957 | Shumaker | 285/134 |
| 3,411,526 | 11/1968 | Schaefer | 285/281 |
| 3,484,853 | 12/1969 | Nishi | 285/134 |
| 4,254,972 | 3/1981 | Wiedenbeck et al. | 285/134 |
| 4,577,892 | 3/1986 | Wrülich et al. | 285/136 |
| 4,758,026 | 7/1988 | Timm | 285/900 |
| 4,971,367 | 11/1990 | Peter et al. | 285/900 |

FOREIGN PATENT DOCUMENTS

| 186166 | of 1922 | United Kingdom | 285/281 |
|---|---|---|---|
| 1187839 | 4/1970 | United Kingdom | 285/278 |

Primary Examiner—Eric K. Nicholson
Attorney, Agent, or Firm—Beaman & Beaman

[57] ABSTRACT

This invention pertains to a rotary joint for use with rotating machinery where the joint is conveying high temperature corrosive fluids such as molten salts. The joint includes both a stationary head to which external connections are made and a housing mounted on and rotating with a rotary apparatus with which the joint communicates. Alignment of the components is maintained through the interaction of two sleeve bearings disposed between a nipple coaxially extending from the head and the joint housing surrounding the nipple; the sleeve bearings being axially displaced from each other, the primary seal occupying an intermediate position. The primary seal is a spherical seal, interposed between a stationary nipple seal surface and a rotary housing sealing surface. The seal is preloaded by means of an external joint biasing support bracket to reduce leakage under conditions of low internal fluid pressures.

13 Claims, 2 Drawing Sheets

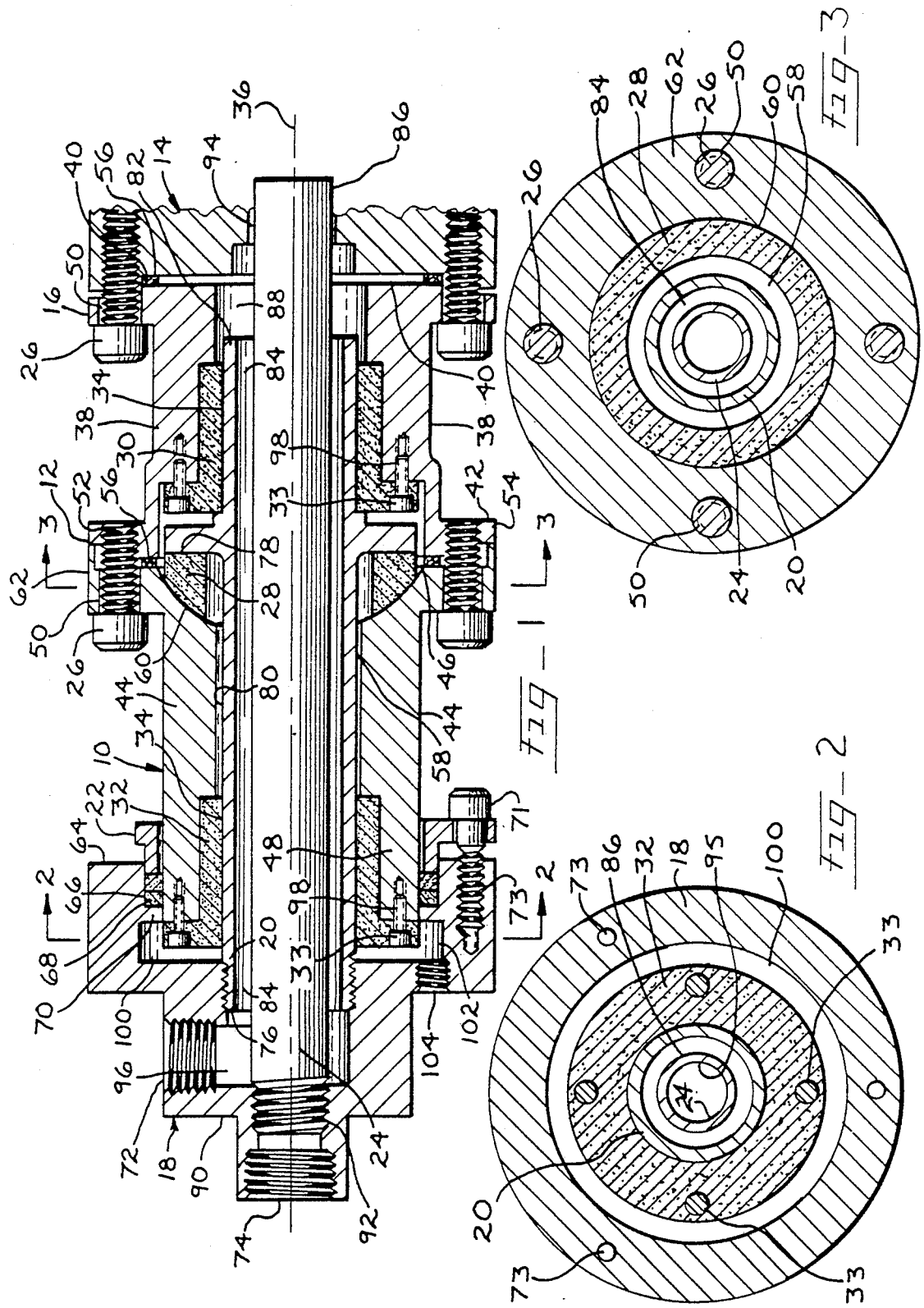

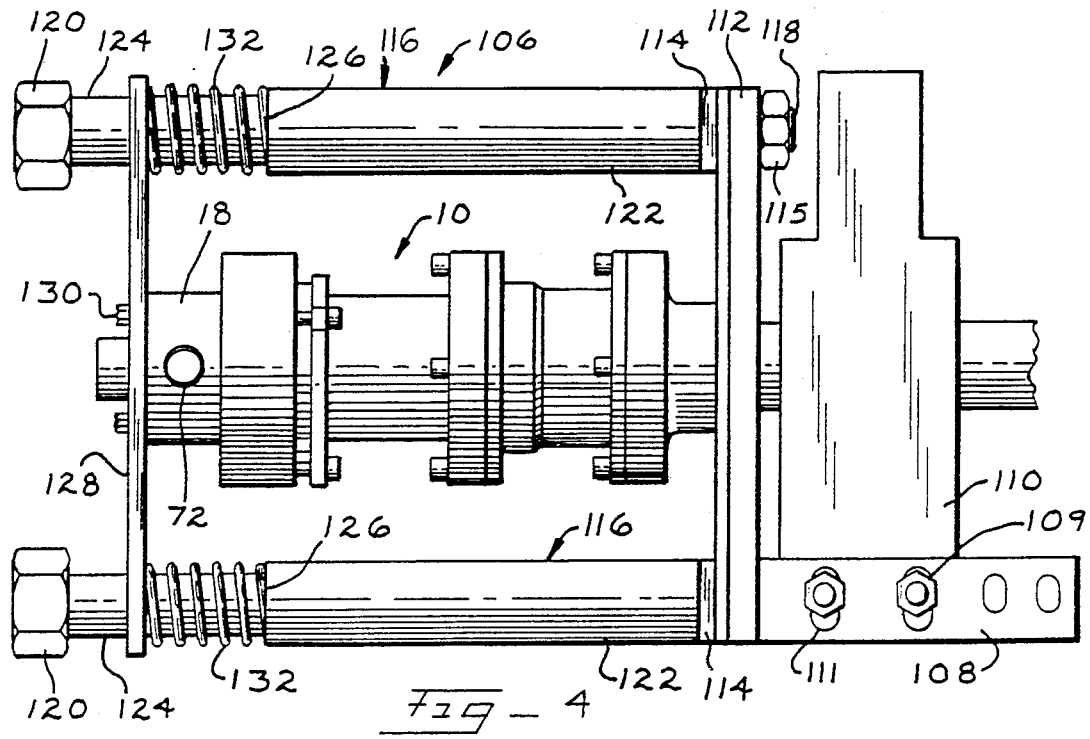
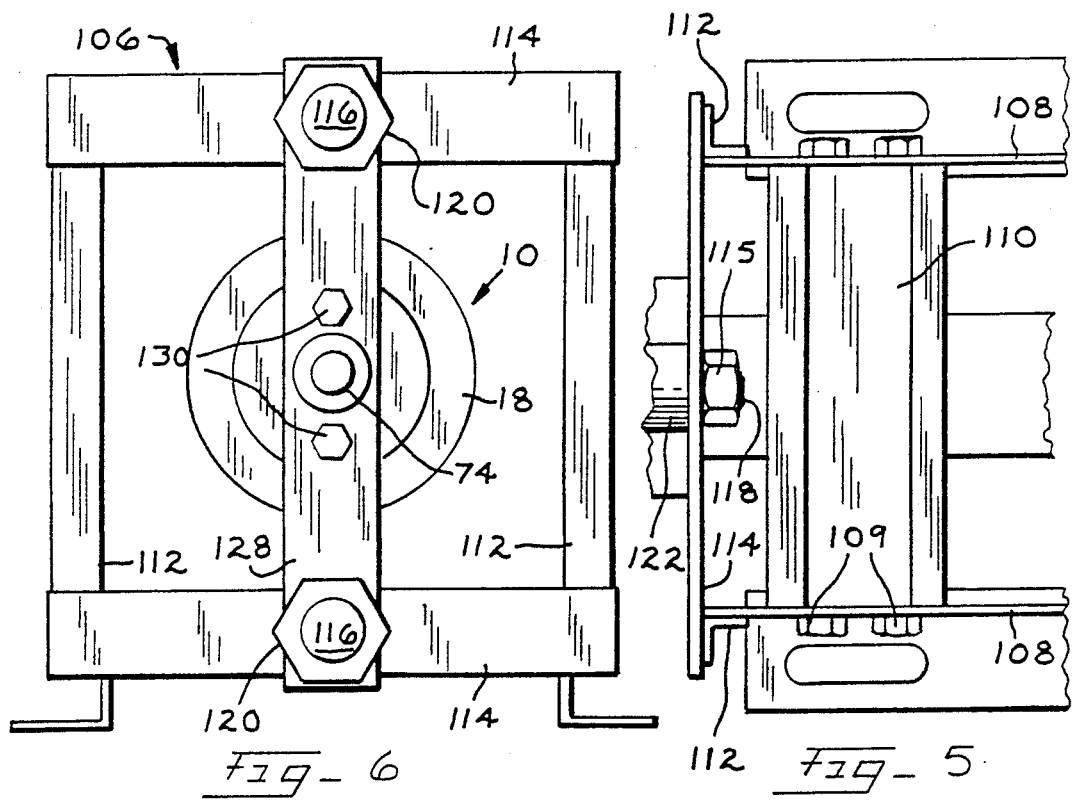

5,110,162

ANTI-CORROSIVE ROTARY JOINT

BACKGROUND OF THE INVENTION

In the industrial processing arts there are many instances in which rotating machinery must be connected to a stationary supply or discharge. In recent years, the need to bulk process materials at high temperatures has created a need for devices capable of functioning in environments radically different from the traditional environments.

FIELD OF THE INVENTION

The present application relates to an apparatus for providing a means to conduct high temperature corrosive fluid flow, such as molten salts, into and out of a rotating apparatus while minimizing fluid leakage to the surrounding environment. Rotary joints are employed to introduce or remove fluids, either in liquid or gaseous states into rotating machinery. While such devices are widely utilized and known in the processing art; continuously rotating high temperature applications, especially those where the fluid is corrosive, demand special features not found in traditional rotary joint configurations.

DESCRIPTION OF RELATED ART

Conventional rotary joints are generally utilized in lower temperature steam environments and therefore traditional structure and materials have been employed in such devices as shown in the assignee's U.S. Pat. Nos. 2,791,449, 4,262,940 and 4,635,969.

The assignee's cited patents and known rotary joints are for lower temperature, steam environment devices; and therefore, the configuration design criteria differ from rotary joints intended to carry high temperature molten salts. For instance, seal materials such as the carbon graphite seals commonly used in rotary joints are generally only useful below 650° F. Furthermore, the seals deteriorate in caustic environments such as molten potassium nitrate, sodium nitrate, and sodium nitrite which are used as high temperature heat transfer mediums.

The single bearing configurations of many patents in the known art create a significant reliance on the sealing system for joint component structural support. One result of these configurations is more frequent seal failures due to wear of parts in rotary contact. Also, any eccentricity present in the alignment of the rotary joint rotary axis with that of the rotating apparatus can transmit cyclic forces to pipes connected to the joint resulting in their failure.

Known patents utilize internal seal biasing springs as is appropriate for low temperature service. In most rotary joint configurations internal biasing springs are used to provide a positive seal. While the internal biasing springs provide a cost effective means of performing this function in traditional environments, they would have to be of special material construction in order to survive exposure to molten salts because conventional spring materials cannot withstand the 1000° F. temperatures of the molten salt environment.

OBJECTS OF THE INVENTION

In view of the foregoing considerations in rotary joint fabrication it is an object of the invention to provide a rotary joint to convey a high temperature fluid, such as molten salts at temperatures on the order of 1000° F., to a rotating machine while providing optimal structural support to the components.

A further object of the invention is to employ materials and structural elements able to function over the broad range of temperatures inherent in high temperature molten salt service, and inherent in the selection of materials to accomplish this objective is to select those materials which will provide enhanced rotary joint corrosion resistance resulting in greatly improved service life.

An additional object of the invention is to employ treatments and materials which will, under the extreme conditions of service, minimize wear of rotating parts and thereby reduce down time due to maintenance and contribute to a greatly improved product life.

Yet another object of the invention is to protect the environment external to the system from corrosive agent contamination by redirecting any fluid which may leak past seals to a safe containment facility.

SUMMARY OF THE INVENTION

The invention pertains to rotary joints for conducting high temperature, pressurized, corrosive fluids. Among the improvements disclosed by the invention are the use of multiple seals, an external biasing support frame and a seepage trap conjunctively employed to avoid leakage. The invention is particularly useful in high temperature mixing machines incorporating a material temperature elevating indirect heat exchanger.

In response to the special application requirements, the invention utilizes high temperature seal and bearing materials which, because of their abrasive characteristics, necessitate special treatment of frictional surfaces in contact with them. This requirement is met through the flame spraying of such frictional surfaces with hard nickel. Another consideration is the need to totally contain the corrosive salts carried by the rotary joint. The invention utilizes a head inner cavity to collect any molten salts which may get by the primary seal and an adjacent sleeve bearing.

The invention employs a unique external biasing structure to provide a positive primary seal. This external structure removes the biasing springs from the deleterious effects of the high temperature molten salt environment thereby economically enhancing the life of the rotary joint assembly. Another cost effective reliability enhancing feature of the invention is the preferred embodiment's two section housing. The two section design facilitates economical rotary joint fabrication and assembly as well as facilitating expeditious field replacement of internal components if necessary. Leakage between the sections as well as between the rotary joint and the rotating apparatus is prevented through employment of bolted flange connections with interposed ring gaskets to ensure fluid-tight integrity.

Alignment of the components is maintained through the interaction of two cylindrical sleeve bearings, disposed between a coaxially extending elongated stationary tubular nipple and the elongated tubular rotating housing surrounding it. The bearings are positioned on either side of a primary seal, which is comprised of a spherical seal interposed between the stationary nipple and the rotary housing. The spherical seal is preloaded to reduce leakage under conditions of low internal fluid pressures by an external support frame, the secondary seal being a cylindrical gland seal. Intermediate the secondary seal and the primary seal, and defined by a head, is a head inner cavity which collects fluid leakage through the primary seal and the intermediate sleeve bearing. This leakage is conveyed through a drain port defined in the bottom of the head by a pipe to a collection vessel. Leakage between housing parts and between the rotary joint and the machine are eliminated through the employment of intermediary flange gaskets and seal rings. While the present embodiment of the invention, provides multiple flow paths, the inventive concepts are equally applicable to single or multiple flow path devices.

BRIEF DESCRIPTION OF THE DRAWINGS

In order that the invention may be clearly understood, it will now be described, by way of example, with reference to the accompanying drawings, wherein:

FIG. 1 is a diametrical cross-sectional elevational view of the rotary joint in accord with the invention, FIG. 2 is a cross-sectional detail view as taken along Section 2—2 of FIG. 1, FIG. 3 is a cross-sectional detail view as taken along Section 3—3 of FIG. 1, FIG. 4 is a side elevational view of the rotary joint and biasing support bracket as related to the rotary joint apparatus, FIG. 5 is a detail plan view of the support bracket as it attaches to the rotary joint apparatus, and FIG. 6 is an elevational end view as taken from the left of FIG. 4.

DESCRIPTION OF THE PREFERRED EMBODIMENTS

With reference to FIG. 1, a rotary joint generally indicated at 10 utilizing the concepts of the invention includes an elongated tubular housing 12 or casing which rotates coaxially with the rotational axis of the rotating apparatus 14 to which it is attached by means of an inner end radial flange 16. The invention comprehends one or several flow paths, two paths being present in the preferred embodiment. The invention can accommodate either unidirectional flow or multidirectional flow with equal facility.

The invention includes an elongated tubular housing 12, head 18, elongated tubular nipple 20, packing gland ring 22, and an internal conduit 24 each fabricated of 316 stainless steel as well as threaded bolts 26 of 304 stainless steel for enhanced corrosion protection. Because of the very high operating temperatures, as well as the corrosive nature of the fluid, the annular, spherical primary seal 28 and the sleeve bearings 30 and 32 are fabricated of silicon carbide which is highly resistant to the salt used as a heat transfer medium in high temperature rotary heat exchanger applications. All rotating surfaces, including the nipple bearing surfaces 34 and primary seal surfaces 60 and 78, which are in contact with silicon carbide are flame sprayed with a hard nickel alloy to minimize wear.

The housing 12, is coaxially mounted on the rotary apparatus 14 and rotates therewith. The housing and rotary apparatus share a common axis 36 with the nipple and internal conduit. The housing comprises a first part 38 with an inner end 40 and an outer end 42; and a second part 44, with an inner end 46 and an outer end 48. The housing first part terminates in mounting flanges on each end with radial mounting bolt holes 50 defined on the inner end flange 16 and threaded bolt holes 52 defined on the outer end flange 54. The housing first part inner end flange 16 connects with the rotary apparatus 14 by means of mounting bolts 26 which pass through the flange bolt holes 50 and engage threaded holes in the rotary apparatus.

The housing second part 44 has an inner end flange 62 which bolts to the threaded holes 52 in the outer end flange 54 of the housing first part 38. A gasket 56 is installed between the flanges to prevent leakage from the housing bore 58. A hard nickel sprayed concave housing spherical annular sealing surface 60 extends inward from the housing second part flange 62 to the housing longitudinal bore 58.

While the housing 12 rotates with the apparatus, the head 18 is stationary. To prevent molten salt leakage between the housing second part outer end 48 and the head inner end 64, a dynamic gland seal is employed which is comprised of a packing chamber 66 defined by the juncture of the head 18, housing second part outer end 48 and packing gland ring 22 with a fiberglass cylindrical packing 68. The head defines a sealing surface 70 which radially extends from the head towards said nipple axis 36 and is removed from the head inner end 64. The head sealing surface 70 is adapted to slidingly receive the housing second part outer end 48 and the cylindrical packing 68 is placed intermediate said head and housing outer end. The packing 68 is comprised of at least one compressible cylindrical ring adapted to closely, sealingly engage all surfaces of the packing chamber 66 and slidingly engage the housing second part outer end 48. The packing gland ring 22 is adapted to circumscribe the housing second part outer end 48 and is axially adjusted by bolts 71 threaded into tapped holes 73 in head 18.

The head 18 has both a fluid supply port 72 and fluid return port 74. The nipple outer end 76 is threaded into the head 18 and coaxially extends from the head into the housing bore 58. The nipple 20 extends through the second sleeve bearing 32 with which it engages and then inward toward the housing first part inner end 40. While being essentially cylindrical throughout most of its length, the nipple has a hard nickel sprayed primary seal surface 78 which radially extends from the nipple outer surface 80 towards the housing second portion inner end 46. The rotary joint primary seal is comprised of the nipple sealing surface 78, in conjunction with the spherical seal 28 and the housing sealing surface 60. The spherical seal 28 is disposed between the housing sealing surface 60 and nipple sealing surface 78 providing a fluid seal between the nipple and the housing. The nipple continues beyond the primary seal surface 78, extending partially into the housing first part 38 where it engages the first sleeve bearing 30. The cooperative effect of the two sleeve bearings and the nipple bearing surfaces is to thereby maintain the head and housing alignment. The nipple inner end 82 is located intermediate the housing first portion inner end 40 and the first sleeve bearing 30 in communication with the nipple bore 84 and the rotating apparatus interior.

The nipple bore 84 communicates with a supply port 72 defined in the head 18. The supply port 72 is an opening perpendicular to the housing and nipple coaxes and adapted to receive an external supply conduit, not shown. The nipple bore inner end communicates with the first sleeve bearing 30 and the spherical seal 28 surrounding the nipple 20 and interposed between the nipple and the housing second part 44. Immediately adjacent to the housing first part inner end and defined by the housing bore 58 and the internal conduit outer wall 86 is a outlet chamber 88 which communicates with the opening 94 defined in rotary apparatus on which the joint is mounted.

The fluid return port 74 is defined on the head outer end 90, and is concentric with the axis 36 of the joint. The return port is adapted to receive an external conduit, not shown, which is in communication with and receives fluid from the internal conduit 24. The threaded head outlet port inner opening 92 joins with the internal conduit 24 which extends coaxially within the nipple bore and through the housing first end feed opening 94 and then into the rotary apparatus; the internal conduit bore 95 thereby communicates with the rotary apparatus interior, thereby defining the second or return flow path.

The head defines an outer cavity 96, adjacent the head supply port 72, which communicates with the rotary apparatus interior through the tubular nipple bore 84, and the housing first end feed opening 94 constituting the first flow path. Fluid leakage from the housing bore 58 between the housing flange 16 and the apparatus 14 is prevented through the installation of an intermediate flange gasket 56.

The invention uses a dual sleeve bearing configuration for enhanced strength. Defined in each of the housing part outer ends are sleeve bearing mounting bolt threaded holes 98. The first sleeve bearing 30 is mounted within the housing first part outer end 42 and extends within the housing toward the inner end 40. Because of its exposure to the molten salt, the first sleeve bearing 30 is "wet" lubricated. The second sleeve bearing 32 is secured by bolts 33 to the housing second part outer end 48 and extends inward within the housing second part disposed between the housing and the nipple outer surface. The interaction of the first and second sleeve bearing with the nipple therebetween maintain housing and head alignment and prevent wobbling as the housing and its attached apparatus rotate as well as reducing the load which the gland seal must bear.

The head inner cavity 100, which is defined by the head 18, nipple outer surface 80 and housing second part 44, receives fluid which has leaked past the primary seal 28 and the second sleeve bearing 32. This fluid collects in the head inner cavity bottom 102 and is removed through a drain port 104, defined in the head inner cavity bottom which is adapted to receive an external conduit, not shown, by which means the fluid is taken to a collection container.

The external support frame 106, shown in FIGS. 4 through 6, supports the outer end of the rotary joint 10 and also applies a axial force to the rotary joint head 18 thereby pre-loading the primary seal by compressing the seal 28 between the housing sealing surface 60 and the nipple sealing surface 78 which is being pulled outward by the action of the support frame 106 upon the head 18. Under conditions of low fluid pressure, rotary joints are typically biased to effect a sufficient seal against leakage. The high temperature, corrosive fluid environment for which the invention is designed has deleterious effects on spring materials, therefore the invention utilizes a unique external biasing support frame.

As best illustrated in FIGS. 4-6, the support frame 106 is mounted upon a journal support or other stationary structure used to support the rotating apparatus 14. The frame 106 is mounted upon a pair of legs 108 which straddle the rotating apparatus stationary portion 110, and the legs 108 are attached to the portion 110 by bolts 109 extending through holes 111 defined in the legs.

The outer end of the legs 108 support an open rectangular frame consisting of vertical elements 112 and spaced parallel horizontal elements 114. The elements 112 and 114 are firmly interconnected by welding, or the like. Guide bolts 116 are identical, and are threaded at each end whereby the inner end 118 may be threaded into holes centrally defined in the elements 114 and fixed by lock nuts 115, and the outer end of the guide bolts are threaded to receive nuts 120. The portion 122 of the guide bolts 116 is of a greater diameter than the cylindrical portion 124 forming a radial shoulder 126.

The support frame 106 is connected to the rotary joint 10 by means of an elongated head plate 128 having holes therein for slidingly cooperating with the guide bolt portions 124, and as will be appreciated from FIGS. 4 and 6 the plate 128 is connected to the joint housing 18 by bolts 130. A compression spring 132 is mounted upon each guide bolt portion 124 between its shoulder 126 and the plate 128 and biases the plate to the left, FIG. 4, which in turn imposes an axial force on the housing 18 and the nipple 20 to maintain engagement of the sealing surfaces 60 and 78 with the seal 28. The use of the springs 132 to maintain engagement of the sealing surfaces is only needed during "cold" or low pressure conditions within the rotary joint as under normal operating conditions the pressure of the medium within the rotary joint will maintain engagement of the seal and sealing surfaces.

As the springs 132 are mounted externally of the rotary joint 10 the springs are not subjected to the very high temperatures within the rotary joint and the resiliency thereof will be maintained over an extended duration. Also, as the guide bolts 116 and plate 128 support the outboard end of the rotary joint 10 transverse bending forces on the joint are partially supported by the frame 106.

The rotary joint of the invention is particularly suitable for use with high temperature pressurized mediums, such as molten salt, in that the bearings 30 and 32 are axially spaced from each other a significant distance which provides excellent resistance and deformation against lateral forces imposed upon the rotary joint. Further, the use of the spherical surfaces at the seal ring 28 provide a most effective rotary seal having limited self-aligning characteristics, and by locating the seal 28 intermediate the bearings 30 and 32 the high strength and alignment between the housing 12 and nipple 20 required under the adverse conditions needed is achieved. Particularly, by locating the seal ring 28 intermediate the bearings 30 and 32 accurate running conditions of the seal ring 28 are assured.

Replacement of the seal ring 28 is simplified by forming the housing 12 in two parts and locating the seal ring at the parting line, and as the housing flanges 54 and 62 can be readily separated upon release of the bolts 26 the seal ring 28 may be readily serviced and replaced. Likewise, the replaceable mounting of the head 18 upon the housing 12 permits bearing 32 to be readily replaced, and bearing 30 may be serviced and replaced at the same time that seal ring 28 is removed.

It is appreciated that various modifications to the inventive concepts may be apparent to those skilled in the art without departing from the spirit and scope of the invention.

We claim:

1. A rotary joint for use with apparatus rotating about an axis particularly characterized by its ability to accommodate high temperature corrosive fluid flow comprising, in combination:
   A. an elongated tubular housing having an axis, inner and outer ends, a longitudinal bore intersecting said ends and a radially extending seal surface intersecting said bore,
   B. housing mounting means defined on said housing inner end for mounting said housing upon the apparatus concentric to the axis thereof for rotation with the apparatus, a passage defined in said mounting means communicating with said housing bore in communication with the apparatus upon said mounting means being mounted upon the apparatus,
   C. an elongated tubular nipple within said housing bore having an axis, an outer surface, inner and outer ends, and a radially extending seal surface extending from said outer surface in axially spaced opposed relation to said housing seal surface, said nipple bore being in communication with said housing bore at said nipple inner end,
   D. an axially spaced bearing means interposed between said housing bore and said nipple outer surface maintaining said nipple axis coaxial with said housing axis,
   E. An annular seal circumscribing said nipple interposed between and engaging said housing and nipple seal surfaces sealing said nipple with respect to said housing,
   F. a head mounted upon and enclosing said housing outer end, said head having an inner end and an outer end, an inlet port defined in said head and a nipple support defined in said head concentric to said nipple axis, said nipple outer end being fixed within said nipple support, said nipple bore being in communication with said inlet port at said nipple outer end, and
   G. a head seal interposed between said head and said housing outer end permitting said housing relative rotational and axial movement with respect to said head, said nipple bore, housing bore and housing mounting means passage establishing communication between the apparatus and said head port.

2. In a rotary joint as in claim 1, a radial flange defined on said housing inner end adapted to closely join with the rotary apparatus, said radial flange having radially spaced bolt holes adapted to receive mounting bolts, and sealing means interposed between said radial flange and the rotary apparatus.

3. In a rotary joint as in claim 1, said housing seal surface being of a spherical concave configuration and a complementary convex surface defined on said annular seal engaging said housing seal surface.

4. In a rotary joint as in claim 1, said head seal including a packing chamber defined in said head, a packing ring located within said chamber and an annular packing gland ring adjustably mounted on said head compressing said packing ring within said packing chamber.

5. In a rotary joint as in claim 1, said axially spaced bearing means comprising first and second cylindrical sleeve bearings mounted within said housing bore on opposite axial sides of said annular seal.

6. In a rotary joint as described in claim 1, wherein said housing comprises of a first part and a second part, said housing first part having inner and outer flanged ends, said housing second part having an inner end flange adapted to engage said first part outer end flange, sealing means intermediate said engaging first and second part flanges, releasably fastening means interconnecting said engaging flanges, said second part outer end adapted to insert into said head inner end and said first part inner end adapted to mount on said rotary apparatus.

7. In a rotary joint as in claim 6, said housing seal surface comprising a spherical concave surface defined in said second part intersecting said second part inner end.

8. In a rotary joint as in claim 6, said head seal being interposed between said head inner end and said housing second portion outer end.

9. In a rotary joint as in claim 1, a cavity defined in said head, a cavity drainage port defined in said head communicating with said cavity, said drainage port adapted to receive a conduit whereby fluid leaking within said housing is received within said cavity and removed from said housing.

10. In a rotary joint as in claim 1, a return port defined in said head, said return port being concentrically located with the housing axis and a return conduit within said nipple having an outer end fixed to said head in communication with said return port and an inner end in communication with the rotating apparatus.

11. In a rotary joint as in claim 1, rotary joint support means fixedly exteriorly mounted adjacent said housing, and spring means mounted on said support means operatively associated with said head axially biasing said head away from said housing to maintain engagement of said annular seal and said housing and nipple seal surfaces.

12. In a rotary joint as in claim 11, elongated guide means defined on said support means substantially parallel to said housing axis, a head plate displaceably supported on said guide means, and fastener means attaching said head plate to said head, said spring means being mounted upon said guide means.

13. In a rotary joint as in claim 12, said guide means comprising elongated bolts and said spring means comprising coil compression springs mounted on said bolts.

* * * * *